US006430558B1

United States Patent
Delano

(10) Patent No.: US 6,430,558 B1
(45) Date of Patent: Aug. 6, 2002

(54) APPARATUS AND METHODS FOR COLLABORATIVELY SEARCHING KNOWLEDGE DATABASES

(75) Inventor: Paul A. Delano, New York, NY (US)

(73) Assignee: Zen Tech, Inc., New York, NY (US)

( * ) Notice: Subject to any disclaimer, the term of this patent is extended or adjusted under 35 U.S.C. 154(b) by 0 days.

(21) Appl. No.: 09/365,927

(22) Filed: Aug. 2, 1999

(51) Int. Cl.[7] .............................. G06F 17/30; G06F 7/00
(52) U.S. Cl. .............................................. 707/5; 707/10
(58) Field of Search .................. 707/3–5, 10, 102–104; 345/329–331

(56) References Cited

U.S. PATENT DOCUMENTS

| 5,717,914 A | * | 2/1998 | Husick et al. | .................. 707/5 |
| 5,749,081 A | * | 5/1998 | Whiteis | ...................... 707/102 |
| 5,832,499 A | * | 11/1998 | Gustman | .................... 707/103 |
| 5,845,278 A | * | 12/1998 | Kirsch et al. | .................. 707/3 |

(List continued on next page.)

OTHER PUBLICATIONS

Glance, N.S. "Community Search Assistant", Proceedings of the International Conference on Intelligent User Interfaces, Jan. 14–17, 2001, pp. 91–96.*

Mitra, M., Singhal, A., and Buckley, C. "Improving Automatic Query Expansion", Proceedings of the 21st Annual International ACM SIGIR Conference on Research and Development in Information Retrieval, Aug. 1998, pp. 206–214.*

Fitzpatrick, L., and Dent, M. "Automatic Feedback Using Past Queries: Social Searching?", Proceedings of the 20th Annual International ACM SIGIR Conference on Research and Development in Information Retrieval, Jul. 1997, pp. 306–313.*

Raghavan, V.V., and Sever, H. "On the Reuse of Past Optimal Queries", Proceedings of the 18th Annual International ACM SIGIR Conference on Research and Development in Information Retrieval, Jul. 1995, pp. 344–350.*

Qui, Y., and Frei, H.P. "Concept Based Query Expansion", Proceedings of the 16th Annual International ACM SIGIR Conference on Research and Development in Information Retrieval, Jun. 1993, pp. 160–169.*

Primary Examiner—Jean R. Homere
Assistant Examiner—Luke S. Wassum
(74) Attorney, Agent, or Firm—Allen, Dyer, Doppelt, Milbrath & Gilchrist, P.A.

(57) ABSTRACT

An apparatus and methods are provided for collaboratively searching one or more knowledge databases formed by a combination of databases from a global computer network. The apparatus preferably includes a computer communications network, a plurality of computer servers positioned in communication with the computer communications network for collectively providing at least one knowledge database, a plurality of client-user computer interfaces positioned in communication with the computer communications network for providing user interface access to the computer communications network, and a collaborative searching engine positioned in communication with the computer communications network and accessible through the plurality of client-user computer interfaces for providing collaborative searching with each of the plurality of client-user computer interfaces. The collaborative searching engine including a query searcher for conducting search queries of content of the at least one knowledge database, a search results ranker responsive to the query searcher for providing ranked content search results representative of the relative closeness of a requested search query to a search inputted by at least one user when conducting a search through use at least one of the plurality of client-user computer interfaces, and a search results updater for continuously updating the content search results responsive to input from other users of the plurality of client-user computer interfaces.

44 Claims, 4 Drawing Sheets

U.S. PATENT DOCUMENTS

| | | | | |
|---|---|---|---|---|
| 5,867,799 A | * | 2/1999 | Lang et al. | 707/1 |
| 5,933,822 A | * | 8/1999 | Braden-Harder et al. | 707/5 |
| 5,974,412 A | * | 10/1999 | Hazlehurst et al. | 707/3 |
| 5,983,214 A | * | 11/1999 | Lang et al. | 707/1 |
| 6,006,217 A | * | 12/1999 | Lumsden | 707/2 |
| 6,006,225 A | * | 12/1999 | Bowman et al. | 707/5 |
| 6,029,161 A | * | 2/2000 | Lang et al. | 707/1 |
| 6,029,195 A | * | 2/2000 | Herz | 709/219 |
| 6,064,980 A | * | 5/2000 | Jacobi et al. | 705/26 |
| 6,088,717 A | * | 7/2000 | Reed et al. | 709/201 |
| 6,092,080 A | * | 7/2000 | Gustman | 707/103 |
| 6,125,361 A | * | 9/2000 | Chakrabarti et al. | 707/3 |
| 6,169,986 B1 | * | 1/2001 | Bowman et al. | 707/5 |
| 6,185,558 B1 | * | 2/2001 | Bowman et al. | 707/5 |
| 6,321,228 B1 | * | 11/2001 | Crandall et al. | 707/10 |
| 6,327,590 B1 | * | 12/2001 | Chidlovskii et al. | 707/5 |

* cited by examiner

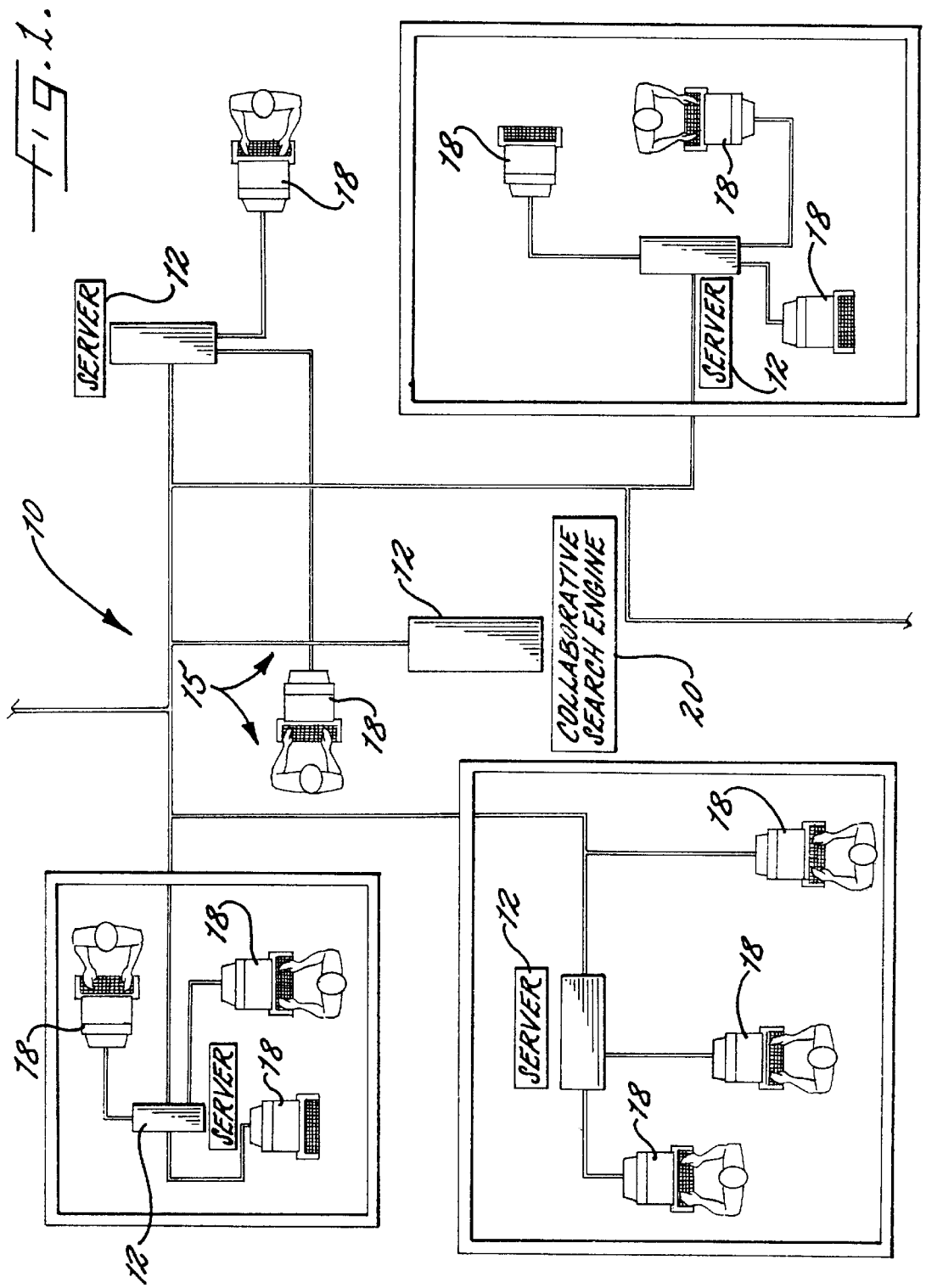

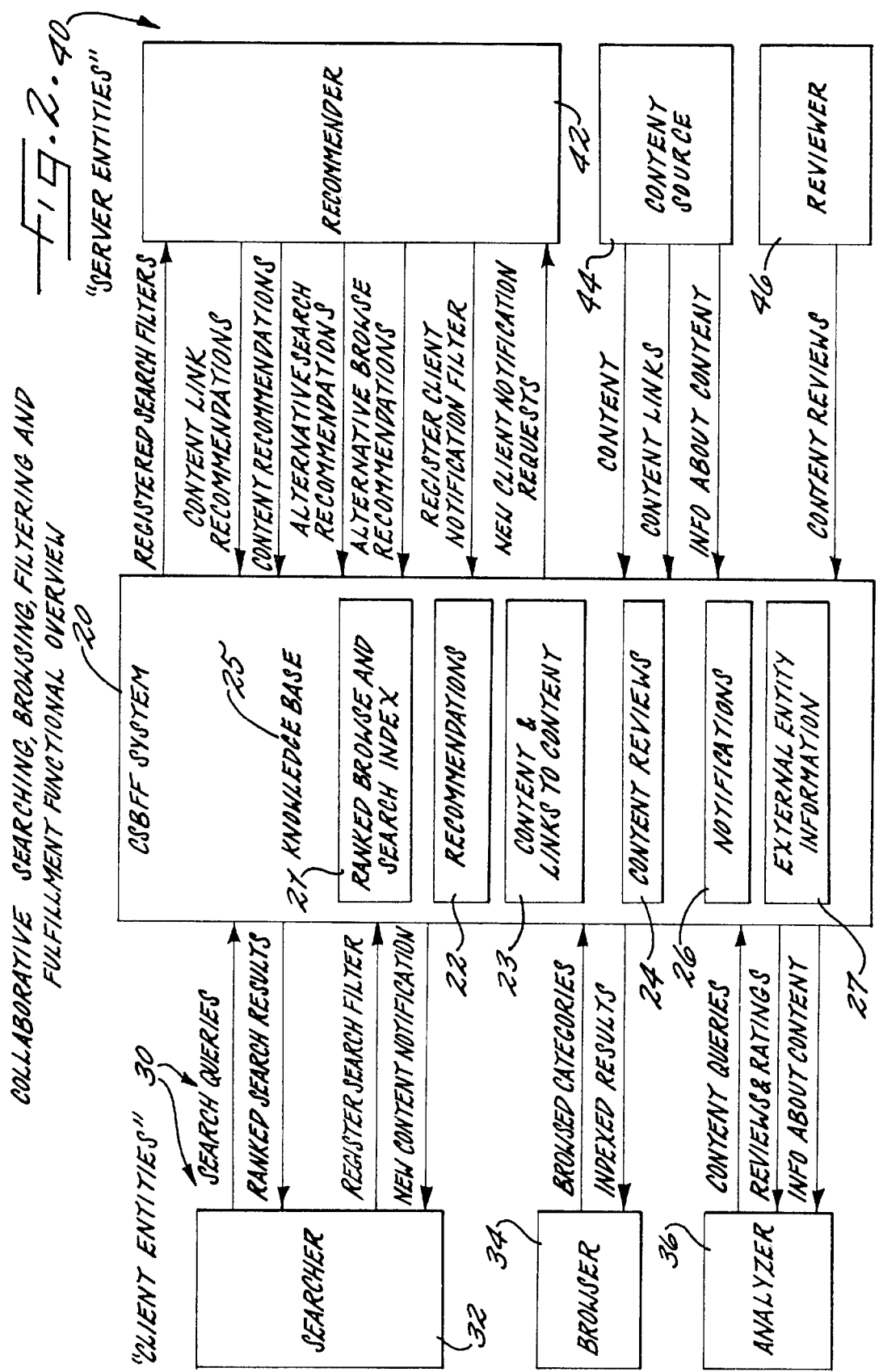

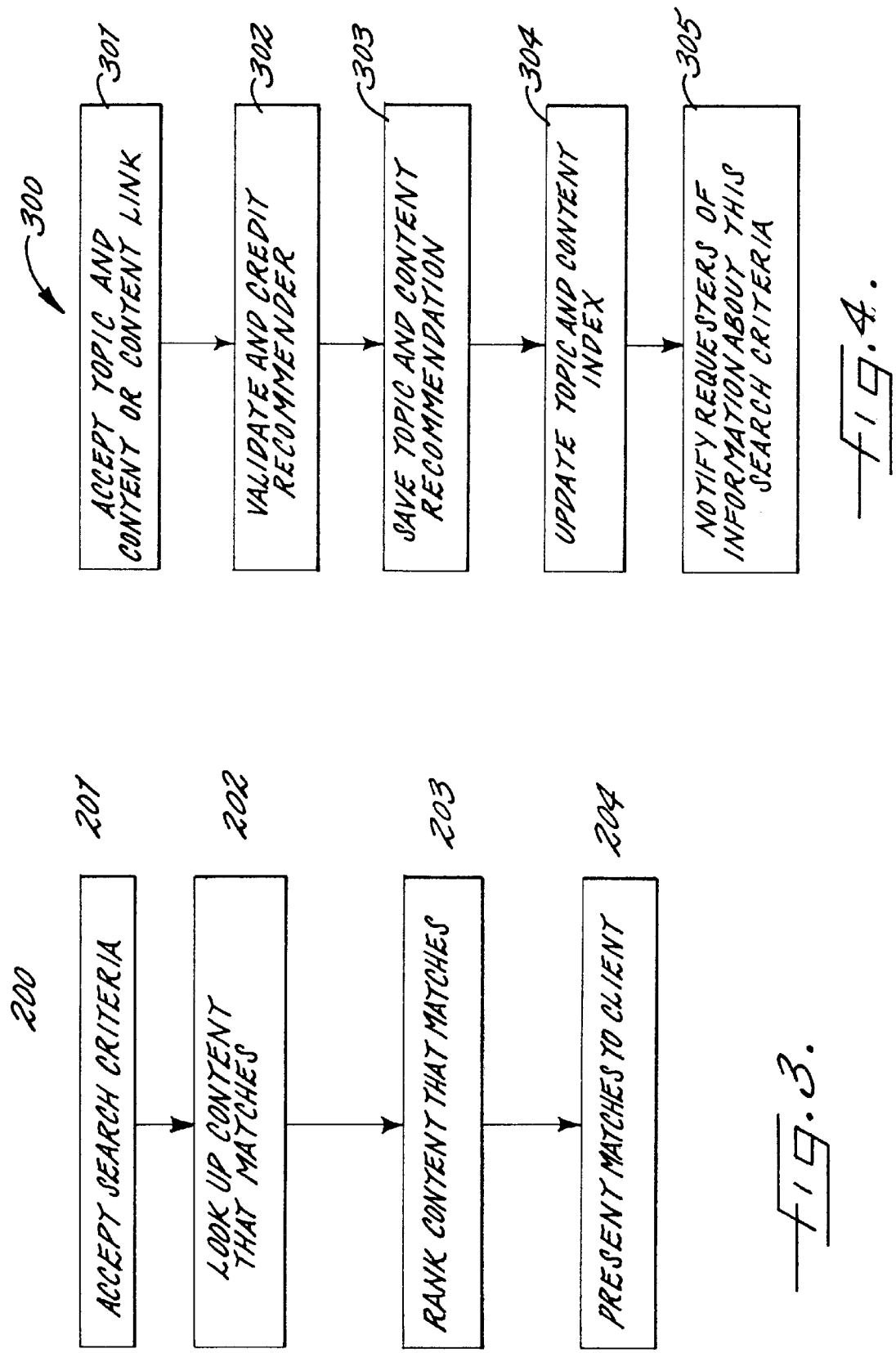

US 6,430,558 B1

APPARATUS AND METHODS FOR COLLABORATIVELY SEARCHING KNOWLEDGE DATABASES

FIELD OF THE INVENTION

The present invention relates to the field of knowledge databases and, more particularly, to a system and methods for searching knowledge databases.

BACKGROUND OF THE INVENTION

The World Wide Web ("WWW") is an example of a global set of networked electronic resources which form one or more knowledge databases which have a common set of protocols to thereby allow users the ability to visually navigate through the database(s) using, for example, one of a plurality of computer interfaces which interface with or link to the networked electronic resources. Information in the WWW can be consistently named and accessed through one or more Universal Resource Locators ("URLs"). Each URL represents one logical grouping of information or data such as a Hyper-Text Markup Language ("HTML") page or an image. HTML pages positioned within HTML browsers provide a format which allows users to interactively browse or search through URLs.

The extremely large amount and volatile nature of information in the WWW can make it extremely difficult for even sophisticated users to find information in this environment Conventional search engine technologies used on the networked electronic resources to search one or more knowledge databases take the approach of keyword indexing the WWW content to allow users the ability to access URLs according to how many keywords match the words they enter. The limitations of this approach are numerous for anyone who has tried to search the WWW using any of the popular search engines. For example, using only a slight variation in the keyword selected by the user may prevent access to some or even a large amount of relevant information within the knowledge database(s) or WWW. Also, the keyword approach fails to provide user notification of changes or modifications to the WWW. Further, the keyword approach takes no account of other users accessing or trying to access related information.

Additionally, systems for extracting and analyzing information from collections of linked documents have also been developed. An example of such a system is shown in U.S. Pat. No. 5,835,905 by Pirolli et al. '905 titled "System For Predicting Documents Relevant To Focus Documents By Spreading Activation Through Network Representations Of A Linked Collection Of Documents."This system creates maps, topology, and text similarity from the collection of linked documents and predicts a relevant set of documents for a subset of linked documents by using one or more of the maps. Although predicting relevant documents may be somewhat helpful in increasing the speed of a search, such a system also fails to substantially increase access to other related information within the databases, fails to provide user notification of changes or modifications to the WWW, and fails to take account of other users accessing or trying to access related information.

Further, systems have been developed for ranking or enhancing the ranking of searches. Examples of such search rankings can be seen in U.S. Pat. No. 5,659,732 by Kirsch titled "Document Retrieval Over Networks Wherein Ranking And Relevance Scores Are Computed," U.S. Pat. No. 5,717,914 by Husick et al. titled "Method For Categorizing Documents Into Subjects Using Relevance Normalization For Documents Retrieved From An Information Retrieval System In Response To A Querry," U.S. Pat. No. 5,826,260 by Byrd, Jr. et al. titled "Information Retrieval System And Method For Displaying And Ordering Information Based On Query Element Contribution," and U.S. Pat. No. 5,845,278 by Kirsch et al. titled "Method For Automatically Selecting Collections To Search In Full Text Searches." Although these systems provide ranking to searches, such systems likewise fail to substantially increase access to other related information within the databases, fail to provide user notification of changes or modifications to the WWW, and fail to take account of other users accessing or trying to access related information.

SUMMARY OF THE INVENTION

With the foregoing in mind, the present invention advantageously provides an apparatus and methods for collaboratively searching knowledge databases such as provided by a global computer network and thereby substantially increase access to other related information with the knowledge databases. The present invention advantageously provides an apparatus and methods which use a combination of the knowledge databases and a plurality of users themselves to collectively search, browse, filter, index, and access information within one or more knowledge databases. The present invention additionally advantageously provides an apparatus and methods for collaboratively searching knowledge databases which overcome many of the obstacles or limitations of the keyword search approach such as providing notification to the users of changes or modifications to the knowledge database which impact searches by users. The present invention further advantageously provides an apparatus and methods for collaboratively searching knowledge databases which adds to or learns from other users conducting the same or related searches within the knowledge database.

For example, using the apparatus and methods of the present invention, information within the WWW or other knowledge database(s) is indexed browsed and searched by relevance to the topic by combining recommendations from previous or past searches from the same or different users that relate content with topics. Information requesters register browse categories and/or search criteria and receive notifications of content that meet their criteria. Information providers access the domain of requested criteria to submit appropriate content. Also, requesters may associate a set of additional credits or points with requests (which providers collect) to increase the chance of their request being fulfilled. Additional informational or advertising content in the form of text, images, audio, video, or other media can advantageously be attached to content recommendations and notifications according to recommendation submitters, content providers, or other filter criteria. Meta-information about content can be submitted and associated with the appropriate content. Meta-information requesters can be used to access information and receive notifications about content reviews, rankings, and changes in content status as they are submitted. "Instrumentation" of HTML pages is provided by taking HTML pages from other sites and modifying the layout with icons and hyperlinks to enable users to easily view ratings, recommend content, and/or notify, share, stash, content through associated icons.

More particularly, the present invention provides an apparatus for collaboratively searching one or more knowledge databases formed by a combination of databases from a global computer network. The apparatus preferably includes a computer communications network, a plurality of serving means positioned in communication with the computer communications network for collectively providing at least one knowledge database, a plurality of client user interfacing means positioned in communication with the computer communications network for providing user interface access to the computer communications network, and collaborative searching means, e.g., a collaborative searching engine, positioned in communication with the computer communications network and accessible through the plurality of client user interfacing means for providing collaborative searching with each of the plurality of client user interfacing means. The collaborative searching means preferably includes query searching means for conducting search queries of content of the at least one knowledge database, search results ranking means responsive to the query searching means for providing ranked content search results representative of the relative closeness of a requested search query to a search inputted by at least one user when conducting a search through use at least one of the plurality of client user interfacing means, and search results updating means for continuously updating the content search results responsive to input from other users of the plurality of client user interfacing means during a predetermined time period.

The present invention also provides a method for collaborative searching at least one knowledge database. The method preferably includes communicating with a computer communications network and through a plurality of client-user computer interfaces and searching with each of the plurality of client-user computer interfaces one or more knowledge databases formed by a combination of databases from a global computer network. The searching step preferably includes the steps of conducting search queries of content of at least one knowledge database, ranking content search results representative of the relative closeness of a requested search query to a search inputted by at least one user when conducting a search through use at least one of a plurality of client-user computer interfaces, and continuously updating the content search results responsive to input from other users of the plurality of client-user computer interfaces.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a schematic block diagram of an apparatus for collaboratively searching knowledge databases according to the present invention;

FIG. 2 is a schematic block diagram of a searching engine of an apparatus for collaboratively searching knowledge databases according to the present invention;

FIG. 3 is a schematic flow diagram illustrating a method of content searching using an apparatus for collaboratively searching knowledge databases according to the present invention;

FIG. 4 is a schematic flow diagram illustrating a method of providing content recommendations using an apparatus for collaboratively searching knowledge databases according to the present invention.

DETAILED DESCRIPTION OF THE PREFERRED EMBODIMENTS

Figure 5:
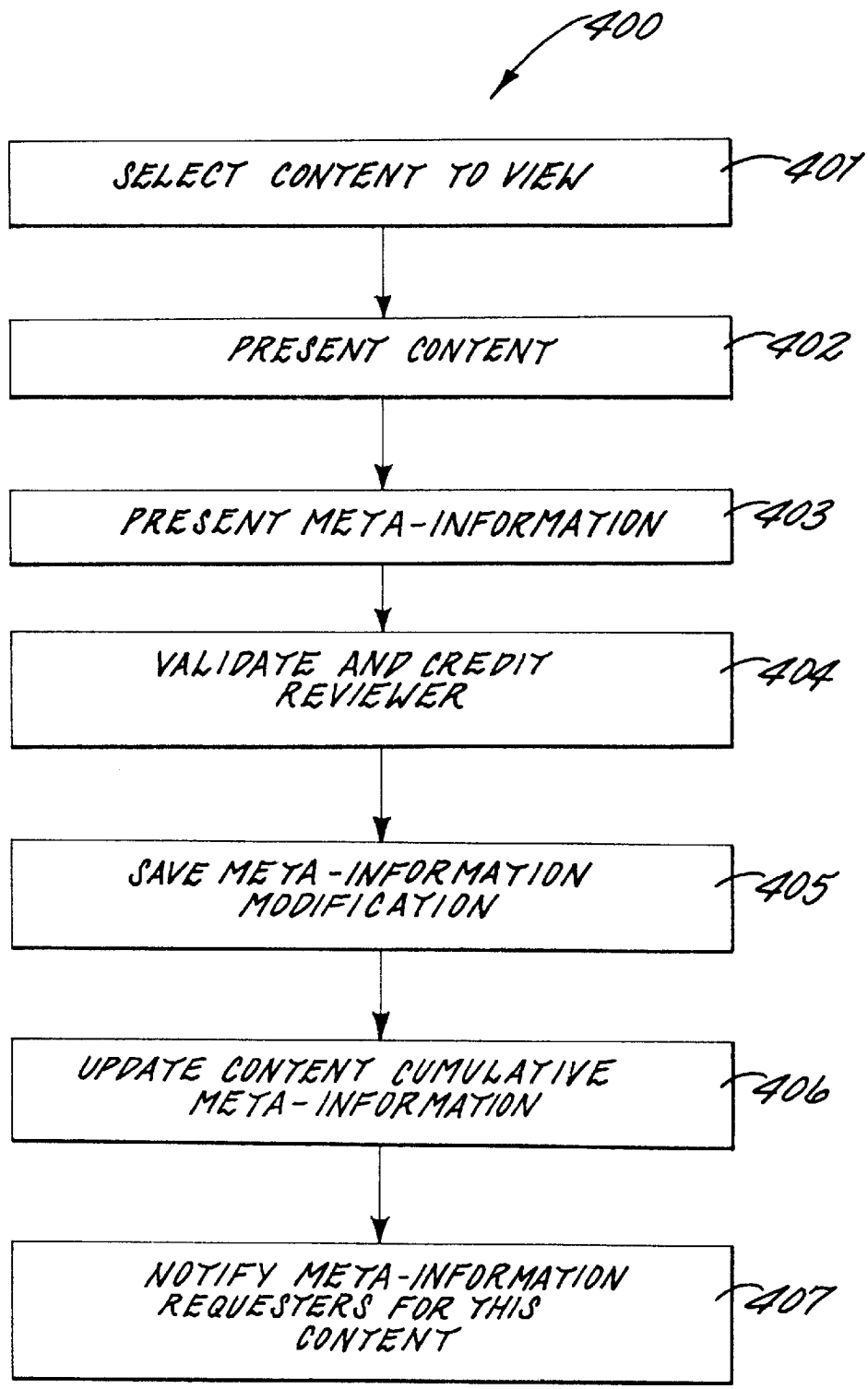
FIG. 5 is a schematic flow diagram illustrating a method for presenting content and content meta-information and processing of content meta-information input using an apparatus for collaboratively searching knowledge databases according to the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements 20 in alternative embodiments.

FIGS. 1–2 illustrate an apparatus 10 for collaboratively searching knowledge databases according to the present invention. The apparatus 10 preferably includes or primarily takes the form of a collaborative searching engine for a global computer network, e.g., the WWW. The apparatus 10 advantageously provides collaborative information gathering, searching, browsing, filtering and fulfillment so that users more readily obtain desired and related information or data within the knowledge database(s) which is searched. The apparatus 10 can be advantageously used for gathering, ranking, and finding information or data in collections of information or data such as found in the World Wide Web ("WWW") As understood by those skilled in the art, however, it will be readily recognized that the apparatus 10 and collaborative searching engine 20 of the present invention are not limited to use on the WWW, but may be utilized in any system or knowledge database which provides access to information content including documents, images, video, audio, textual commentary, or other data to be searched or located.

The following terms defined herein are familiar to users of the WWW and take on these familiar meanings:

World Wide Web or Web: The portion of the Internet that is used to store and access linked documents and content. In this context it also encompasses other networks not connected to the Internet, but that use the same technologies for implementation.

Web Page or Page: A document accessible on the Web. A Page may have multi-media content as well as relative and absolute links to other pages.

Uniform Resource Locator or URL: The address or identifier for content on the Web.

Link: An indicator on a Web page which refers to another Web page and which can typically be retrieved in a point and click fashion. The Link will specify the URL of the Web page.

Web Browser or Browser: A tool which enables a user to traverse through and view documents residing on the Web. Other rendering means associated with the Browser will permit listening to audio portions of a document or viewing video or image portions of a document.

Meta-information: Characteristic information for a particular Web page, including name, file size, number of links to pages in the Web locality, reviews and ratings of the page content, etc.

Topic: A search or categorization criteria, typically represented as a text string, but may include other filtering or contextual information, including sound/audio and voice recognition patterns, to provide other information about the criteria.

Content: A piece of information or data that provides the fulfillment to a topic request. Content includes, but is not limited to Links to other resources, text, hypertext, images, audio, video, alternative Topics, and sub-topics.

Credit: One token of compensation to reward external entities to the system. Credits may be collected by entities and used to compensate them at some point of time in the future.

Notification: A system initiated publishing of information to external entities. This may be implemented by, but is not limited to sending electronic mail to the entity to be notified.

An apparatus 10 and methods of the present invention preferably operates within the context of various external entities and contains functional modules and a knowledge base 25 of information to support entity operations as shown in FIG. 2. Client Entities 30 consist of user or automatic interface entities such as Searchers 32, Browsers 34, and Analyzers 36 that query one or more knowledge databases 25 through a computer communications network 15 for information and receive appropriate replies. Server Entities 40 consist of user or automatic interface entities such as Recommenders 42, Content Sources 44, and Reviewers 46 that provide information to the apparatus 10 either automatically or upon request from the system. The collaborative searching engine 20 is preferably all formed of software on a server loaded and/or mounted, as understood by those skilled in the art, and preferably includes a set of functional modules and knowledge base information storage components that implement the functionality of the present invention.

As illustrated in FIGS. 1–2, an apparatus 10 for collaboratively searching one or more knowledge databases 25 formed by a combination of databases from a global computer network 15 is provided. The apparatus 10 preferably includes a computer communications network 15, a plurality of serving means, e.g., one or more servers positioned in communication with the computer communications network 15 for collectively providing at least one knowledge database 25, a plurality of client user interfacing means, e.g., computers 18, positioned in communication with the computer communications network 15 for providing user interface access to the computer communications network 15, and collaborative searching meansi e.g., a collaborative searching, browsing, filtering, and fulfillment ("CSBFF") engine 20, positioned in communication with the computer communications network 15 and accessible through the plurality of client user interfacing means 18 for providing collaborative searching with each of the plurality of client user interfacing means 18. The collaborative searching means 20 preferably includes query searching means, e.g., a searcher 32, for conducting search queries of content of the at least one knowledge database 25, search results ranking means 21 responsive to the query searching means 32 for providing ranked content search results representative of the relative closeness of a requested search query to a search inputted by at least one user when conducting a search through use of at least one of the plurality of client user interfacing means 18, and search results updating means, e.g., preferably provided by the server entities 40 or at least the recommender 42 thereof, for continuously updating the content search results responsive to input from other users of the plurality of client user interfacing means 18.

The collaborative searching engine 20 preferably also includes search content browsing means for browsing the content of the search results, search recommending means, e.g., a recommender 42, responsive to the plurality of serving means 12 for recommending at least one of content providing (including content linking), alternative searching, and alternative browsing queries to a user of the collaborative searching engine 20 through at least one of the plurality of client user interfacing means 18, and modification notifying means, e.g., notifications 26, responsive to the plurality of serving means 12 for providing notification of updates to the knowledge database 25. The updates, for example, include at least one of updates from the plurality of serving means 12, updates from other users conducting additional search queries on computers 18, and updates to the collaborative searching engine 20.

The searching engine 20 of the present invention operates as a collaborative filtering system because the external entities that provide the content and ranking information may be the same physical entity type, or even the same entity. For example, a user acting as a Searcher entity 32 may search for information on a topic and then act as a Recommender entity 42 to recommend some new content that they have found for that topic or another topic. Additionally, the invention encompasses the scenario where the Recommender 42 is actually an external system that populates the Knowledge Base 25 with appropriate content recommendations upon request or automatically according to a predetermined schedule, or as new information arrives into the external system. The Recommender 42, for example, can include a Webcrawler or Webspider, as understood by those skilled in the art, which crawls or goes across different databases within a network or of the web. The collaborative searching engine 20 continuously updates and puts all of the Recommendations 22 together into one Knowledge Base 25 and ranks the results of search requests and notifies Client entities that have requested new content associated with specific topics.

A searching method 200 of an apparatus 10 of the present invention is illustrated in FIG. 3. A search begins in step 201 with the submission and acceptance of the search topic or criteria from the Searcher entity 32. This search topic consists of any information by which the content in the knowledge base 25 has been indexed, and is typically a text search string with additional text or category filters that may restrict the search to a particular sub-domain of the index. The next step 202 is to use a Ranked Topic and Content Index or Browse and Search Index 21 to determine or look up the content that is appropriate to or matches the request. The Ranked Topic and Content Index 21 may be any information source from which the appropriate content can be retrieved according to the topic filter applied. This can be accomplished with a relational database table or tables which contain the relationship between the search topics, the content, and the applicability weight of the relationship between the topic and content. Once the appropriate content is selected, the content is sorted or ranked accordingly from the most applicable to the least applicable as in step 203. In step 204, the ranked content is then presented to the user in the desired output format, typically a Web Page or set of pages that display the list of content and content links from which the Searcher 32 can choose.

If there is no suitable content that meets the topic criteria of the Searcher 32, the Searcher 32 may submit a Topic Notification Request to the engine 20. Once it is entered, when content is added to that topic by Recommenders 42, that Searcher 32 is sent a notification of the new content. A Credit bounty may also be placed on the Topic Notification Request so that when the new content is added, the Recommender 42 gains additional Credits, and the Searcher 32 loses the Credits. The Credit transaction may take place when the recommendation is submitted and/or after the Searcher approves the recommendation.

A recommendation method 300 of the apparatus 10 is illustrated in FIG. 4. A recommendation 22 begins in step 301 with the submittal and acceptance of the topic and the content or content link from the Recommender 42. The topic and content are validated for correctness and completeness in step 302. If errors are detected, the recommendation 22 is not accepted and the Recommender 42 may be notified of the error and prompted for resubmission. If all is correct, in step 302, the Recommender 42 is also credited with the appropriate number of Credits according to the Credits associated with that particular Topic or Content. Note that Credits may be associated with certain Topic recommendations 22 as described in the Notification Request process. Additionally, Credits may be associated with certain types of Content, for example for Content that contains Links to a particular Web Site 23.

Once the Recommender 42 has been credited, the recommendation 22 is saved in step 303, and the Topic and Content Index 21 (including associated topics) is updated in step 304 to reflect the new information. This process is then repeated, e.g., continuously. At some time in the future, the recommendation 21 may be further validated to verify that the information, such as Content Link is valid and appropriate for the associated Topic. After the index is updated, any Client Searcher entities 40 that requested notifications on that Topic are notified as in step 305. Facilities are provided to Recommenders 42 to find topics that have been requested. They may be filtered and presented to the Recommenders 42 according to criteria such as topic, Credit bounty, date, or other criteria. This allows Recommenders 42 to recommend content for topics of special interest to Searchers 32. Also, the content search results advantageously can be weighted based upon time (e.g., last month vs. last year), the particular recommender or user, frequency, number, or other criteria.

A meta-information review method 400 of the apparatus 10 is illustrated in FIG. 5. A review begins in step 401 with the selection of the content to be reviewed by the Reviewer 46. This selection may be of the form of selecting the content from a list of or source of contents 44 presented after a search, or may be through some other mechanism such as the direct entry of a URL or entry of the content itself. Once the content is determined, in step 402, the existing meta-information and the content itself may optionally be presented to the Reviewer. In step 403 meta-information is collected from the Reviewer 46 in the form of quantitative and qualitative information as well as specific information about the site such as a contact name and address The information is then validated in step 404 to ensure that the information is legitimate according to the type of information entered. If errors are detected, the meta-information is not accepted and the Reviewer 46 may be notified of the error and prompted for resubmission. If all is correct, in step 404, the Reviewer 46 is also credited with the appropriate number of Credits according to the Credits associated with reviewing that particular Content. Once the Reviewer 46 has been credited, the meta-information is saved in step 405, and the cumulative meta-information such as cumulative rating is updated in step 406. After the cumulative information is updated, any Client Analyzer entities 36 that requested notifications on that content are notified in step 407. Meta-information may also be collected from the content source 44 itself. For example, information such as the size, type, or disposition of the content may be available by querying the content source itself.

The topics used to index the content in the Knowledge Base 25 can be organized into a hierarchy that can be browsed by Browser entities 34. The collaborative searching engine 20 presents the top level topics to Browser entities 34 which can follow Links to sup-topics or similar topics to access specific Content items. At each level, the subtopics can be presented to the user in a weighted ranking similar to the search mechanism, or can be presented in some other optimal ordering, such as most recently added or alphabetically. Subtopics can also be considered to be content items which can be recommended at appropriate topic levels by Recommender critics.

The content meta-information can be accessed by Analyzer client entities 36 once a particular content item has been identified via search, browse, or direct content entry methods. Once content is identified, it may be presented to the Analyzer 36 in various formats as appropriate to the interests of the users. Additionally, the Analyzer entity 36 may request to be notified when changes are made to the meta-information due to new reviews.

Additional content in the form of text, images, audio, video or other media may be attached to content recommendations 22 and notifications 26 according to recommendation submitter, content provider, or other filter criteria. For example, special informational or advertising content can be displayed whenever content from a particular Web Site is presented to Client entities 30.

Specific information from the collaborative searching engine 20 may be presented on or integrated with other searching engines or Web Sites, e.g., external entity information 27, in various formats to provide value to users of other systems. For example, the cumulative quality rating meta-information of each content link on a Web Page of another could be presented as a rating number or symbol image embedded in the other site's web page, with the information and/or image coming from the collaborative searching engine 20 of the apparatus 10. In essence, the results of other searching engines or Websites advantageously can be integrated with the collaborative searching engine 20. For example, Instrumentation of HTML pages is provided by taking HTML pages from other sites and modifying the layout of icons and hyperlinks to enable users to easily view ratings, recommend content, and/or notify, share, or stash content through associated icons.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for collaboratively searching one or more knowledge databases formed by a combination of databases from a global computer network, the apparatus comprising:

a computer communications network;

a plurality of serving means positioned in communication with the computer communications network for collectively providing at least one knowledge database;

a plurality of client user interfacing means positioned in communication with the computer communications network for providing user interface access to the computer communications network; and collaborative searching means positioned in communication with the computer communications network and accessible through the plurality of client user interfacing means for providing collaborative searching with each of the plurality of client user interfacing means, said collaborative searching means including collaborative query searching means for conducting search queries of content of the at least one knowledge database, the collaborative query searching means including a topic filter through which to pass the search queries, a memory to store prior search queries, and a relational database responsive to search queries passing through the topic filter and the prior searches stored in memory to relate the filtered search queries to the stored prior searches, search results ranking means responsive to said query searching means for providing ranked collaborative content search results representative of objectively determined relative closeness of a requested search query to a search inputted by at least one program user and at least one other program user of the at least one knowledge database using search queries related to the search query inputted by the at least one program user when conducting a search through use of at least one of the plurality of client user interfacing means, and search results updating means for continuously updating the content search results responsive to input from other users of the plurality of client user interfacing means.

2. An apparatus as defined in claim 1, wherein said collaborative searching means further includes search content browsing means for browsing the content of the search results.

3. An apparatus as defined in claim 2, wherein said collaborative searching means further includes search recommending means responsive to the plurality of serving means for recommending at least one of content providing, alternative searching, and alternative browsing queries to a user of said collaborative searching means through at least one of the plurality of client user interfacing means.

4. An apparatus as defined in claim 1, wherein said collaborative searching means further includes modification notifying means responsive to the plurality of serving means for providing notification of updates to the knowledge database, the updates including at least one of updates from the plurality of serving means, updates from other users conducting additional search queries, and updates to said collaborative searching means.

5. An apparatus as defined in claim 2, wherein said query searching means includes information requester registers in communication with said search content browsing means for registering browsing categories and searching criteria and receiving notifications of content that meet the criteria.

6. An apparatus for collaboratively searching one or more knowledge databases formed by a combination of databases from a global computer network, the apparatus comprising:

a computer communications network;

a plurality of computer servers positioned in communication with the computer communications network to collectively provide at least one knowledge database;

a plurality of client-user computer interfaces positioned in communication with the computer communications network to provide user interface access to the computer communications network; and a collaborative searching engine positioned in communication with the computer communications network and accessible through the plurality of client-user computer interfaces for providing collaborative searching with each of the plurality of client-user computer interfaces, the collaborative searching engine including a collaborative query searcher positioned to conduct search queries of content of the at least one knowledge database, the collaborative searcher including a topic filter through which to pass the search queries, a memory to store prior search queries, and a relational database responsive to search queries passing through the topic filter and the prior searches stored in memory to relate the filtered search queries to the stored prior searches, a search results ranker responsive to the query searcher to provide ranked content search results representative of objectively determined relative closeness of a requested search query to a search inputted by at least one program user and at least one other program user of the at least one knowledge database using search queries related to the search query inputted by the at least one program user when conducting a search through use of at least one of the plurality of client-user computer interfaces, and a search results updater for continuously updating the content search results responsive to input from other users of the plurality of client-user interfaces.

7. An apparatus as defined in claim 6, wherein said collaborative searching engine further includes a search content browser positioned to browse the content of the search results.

8. An apparatus as defined in claim 7, wherein the collaborative searching engine further includes a search recommender responsive to the plurality of computer servers for recommending at least one of content providing, alternative searching, and alternative browsing queries to a user of the collaborative searching engine through at least one of the plurality of client-user computer interfaces.

9. An apparatus as defined in claim 8, wherein the collaborative searching engine further includes modification notifying means responsive to the plurality of serving means for providing notification of updates to the knowledge database, the updates including at least one of updates from the plurality of computer servers, updates from other users conducting additional search queries, and updates to the collaborative searching engine.

10. An apparatus as defined in claim 9, wherein said query searcher includes information requester registers in communication with said search content browser to register browsing categories and searching criteria and to receive notifications of content that meet the criteria.

11. A collaborative searching engine for communicating with a computer communications network and accessible through a plurality of client-user computer interfaces for providing collaborative searching with each of the plurality of client-user computer interfaces to one or more knowledge databases formed by a combination of databases from a global computer network, the collaborative searching engine comprising:

collaborative query searching means for conducting search queries of content of at least one knowledge database the collaborative query searching means including a topic filter through which to pass the search queries, a memory to store prior search queries, and a relational database responsive to search queries passing through the topic filter and the prior searches stored in memory to relate the filtered search queries to the stored prior searches;

search results ranking means responsive to said query searching means for providing ranked content search results representative of objectively determined relative closeness of a requested search query to a search inputted by at least one program user and at least one other program user of the at least one knowledge database using search queries related to the search query inputted by the at least one program user when conducting a search through use of at least one of a plurality of client-user computer interfaces; and search results updating means for continuously updating the content search results responsive to input from other users of the plurality of client-user computer interfaces.

12. A collaborative searching engine apparatus as defined in claim 11, further comprising search content browsing means for browsing the content of the search results.

13. A collaborative searching engine as defined in claim 12, further comprising search recommending means responsive to a plurality of computer servers for recommending at least one of content providing, alternative searching, and alternative browsing queries to a user of the collaborative searching engine through at least one of the plurality of client-user computer interfaces.

14. A collaborative searching engine as defined in claim 13, further comprising modification notifying means responsive to the plurality of computer servers for providing notification of updates to the knowledge database, the updates including at least one of updates from the plurality of computer servers, updates from other users conducting additional search queries, and updates to the collaborative searching engine.

15. A collaborative searching engine as defined in claim 14, wherein said query searching means includes information requester registers in communication with said search content browsing means for registering browsing categories and searching criteria and receiving notifications of content that meet the criteria.

16. A method for collaborative searching at least one knowledge database comprising the steps of:
   communicating with a computer communications network and through a plurality of client-user computer interfaces; and
   collaboratively searching with each of the plurality of client-user computer interfaces one or more knowledge databases formed by a combination of databases from a global computer network, the searching step including the steps of conducting search queries of content of at least one knowledge database using a collaborative searcher including a topic filter through which to pass the search queries, a memory to store prior search queries and a relational database responsive to queries, and a relational database responsive to search queries passing through the topic search filter and the prior searches stored in memory to relate the filtered search queries to the stored prior searches, ranking content search results representative of objectively determined relative closeness of a requested search query to a search inputted by at least one program user and at least one other program user of the at least one knowledge database using search queries related to the search query inputted by the at least one program user when conducting a search through use of at least one of a plurality of client-user computer interfaces, and continuously updating the content search results responsive to input from other users of the plurality of client-user computer interfaces.

17. A method as defined in claim 16, further comprising the step of browsing the content of the search results.

18. A method as defined in claim 17, further comprising the step of recommending at least one of content providing, alternative searching, and alternative browsing queries to a user of the plurality of client-user computer interfaces.

19. A method as defined in claim 16, further comprising the step of notifying users of updates to the knowledge database, the updates including at least one of updates from the plurality of computer servers and updates from other users conducting additional search queries.

20. A method as defined in claim 17, further comprising the steps of registering browsing categories and searching criteria and receiving notifications of content that meet the criteria.

21. An apparatus as defined in claim 1, wherein the said search results ranking means responsive to said query searching means provides ranked content search results representative of the closeness of a requested search query submitted by a second user subsequent to a search inputted by a first user.

22. An apparatus as defined in claim 6, wherein the search results ranker responsive to the query searcher provides a ranked content search results representative of the closeness of a requested search query submitted by a second user subsequent to a search inputted by a first user.

23. A collaborative search engine as defined in claim 11, wherein the search results ranking means responsive to said query searching means provides ranked content search results representative of the closeness of a requested search query submitted by a second user subsequent to a search inputted by a first user.

24. A method as defined in claim 16, wherein the step of ranking content search results further comprises ranking content search results representative of the relative closeness of a requested search query submitted by a second user subsequent to a search inputted by a first user.

25. A method as defined in claim 20, further including a credit transaction step comprising granting to a recommending user and withdrawing from a searching user a credit based on a predetermined credit bounty when content meeting the criteria is added to content search results.

26. A method as defined in claim 25, wherein the credit transaction is performed when a recommendation is submitted.

27. A method as defined in claim 25, wherein the credit transaction is performed after a searching user approves the recommendation.

28. An apparatus as defined in claim 3, wherein the search recommending means includes content recommendation populating means for populating the at least one knowledge database with at least one content recommendation provided by an entity positioned externally from the collaborative searching means.

29. An apparatus as defined in claim 28, wherein the content recommendation populating means populates the at least one knowledge database with content recommendations in response to new information being introduced into the entity positioned externally from the collaborative searching means.

30. An apparatus as defined in claim 3, wherein the search recommending means includes content recommendation populating means for populating the at least one knowledge database with content recommendations according to a predetermined schedule.

31. An apparatus as defined in claim 8, wherein the search recommender includes an externally-sourced content recommender adapted to supply at least one content recommendation to the at least one knowledge database based on information provided by an entity positioned externally from the collaborative searching means.

32. An apparatus as defined in claim 31, wherein externally-sourced content recommender supplies at least one content recommendation in response to new information being introduced into the entity positioned externally from the collaborative searching means.

33. An apparatus as defined in claim 8, wherein the search recommending means includes an externally-sourced content recommender adapted to supply at least one content recommendation to the at least one knowledge database according to a predetermined schedule.

34. An apparatus as defined in claim 11, wherein the search recommending means includes content recommendation populating means for populating the at least one knowledge database with at least one content recommendation provided by an entity positioned externally from the collaborative searching means.

35. An apparatus as defined in claim 34, wherein the content recommendation populating means populates the at least one knowledge database with content recommendations in response to new information being introduced into the entity positioned externally from the collaborative searching means.

36. An apparatus as defined in claim 11, wherein the search recommending means includes content recommendation populating means for populating the at least one knowledge database with content recommendations according to a predetermined schedule.

37. A method as defined in claim 16, further comprising the step of recommending at least one content recommendation based on information provided by an entity positioned externally from the collaborative searching means.

38. An apparatus as defined in claim 37, wherein the step of recommending at least one content recommendation based on information provided by a system positioned externally from the computer communication network is preformed in response to new information being introduced into the entity positioned externally from the collaborative searching means.

39. A method as defined in claim 16, further comprising the step of recommending at least one content recommendation according to a predetermined schedule.

40. A method as defined in claim 39, wherein the at least one content recommendation is based on information provided by an entity positioned externally from the collaborative searching means.

41. A method as defined in claim 18, wherein the step of recommending includes submitting and accepting a search topic and a recommender-supplied content or content link.

42. A method as defined in claim 41, wherein the step of recommending further includes validating the search topic and recommender-supplied content or content link based on a determination of the correctness and completeness of the search topic and recommender-supplied content or content link.

43. A method as defined in claim 42, wherein the step of recommending further includes designating an error when the search topic or recommender-supplied content or content link, defining a first submission, is determined to be incorrect or incomplete, providing a method user a notification of the error, and prompting the method user to provide a second submission of a search topic or recommender-supplied content or content link.

44. A computer program stored in a memory medium for use in collaboratively searching at least one knowledge database formed by a combination of databases from a global computer network, the program comprising:

collaborative query searching means for conducting search queries of content of the at least one knowledge database, the collaborative query searching means including a topic filter through which to pass the search queries a memory to store prior search queries, and a relational database responsive to search queries passing through the topic filter and the prior searches stored in memory to relate the filtered search queries to the stored prior searches;

search results ranking means responsive to said query searching means for providing ranked content search results representative of the relative closeness of a requested search query to a search inputted by at least one program user when conducting a search through use of one of a plurality of user interfacing means in communication with the processor; and search results updating means for continuously updating the content search results responsive to input from at least one other user of the plurality of user interfacing means.

* * * * *

UNITED STATES PATENT AND TRADEMARK OFFICE
CERTIFICATE OF CORRECTION

PATENT NO.    : 6,430,558 B1                                              Page 1 of 1
DATED         : August 6, 2002
INVENTOR(S)   : Paul A. Delano It is certified that error appears in the above-identified patent and that said Letters Patent is hereby corrected as shown below:

Column 5,
Line 35, delete "meansi" insert -- means, --

Signed and Sealed this

Eleventh Day of February, 2003

JAMES E. ROGAN
*Director of the United States Patent and Trademark Office*